Patented Sept. 1, 1931

1,821,038

UNITED STATES PATENT OFFICE

NORBERT STEIGER, OF FRANKFORT-ON-THE-MAIN, GERMANY, ASSIGNOR TO GENERAL ANILINE WORKS, INC., OF NEW YORK, N. Y., A CORPORATION OF DELAWARE

PROCESS FOR MANUFACTURING 1-HALOGEN-2-AMINO-NAPHTHALENE-SULPHONIC ACIDS

No Drawing. Application filed February 6, 1929, Serial No. 338,032, and in Germany February 11, 1928.

My present invention relates to a process of preparing 1-halogen-2-amino-naphthalene sulphonic acids and to the new products obtainable thereby, more particularly it relates to a process which comprises replacing one hydrogen atom of the $NH_2$ group of a 2-amino-naphthalene sulphonic acid of the general formula:

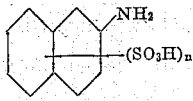

wherein $n$ means one of the numbers 1 or 2, by a carboxylic acid residue, treating the compounds thus obtained with a halogenating agent in an aqueous medium, leaving the halogenation products to the influence of a strong mineral acid, and finally splitting off the carboxylic acid residue. The reaction probably takes place in the following manner: The halogen atom is at first bound to the nitrogen atom of the 2-acyl-amino-naphthalene sulphonic acid formed by the first step of my process, then this N-halogen compound is converted into an 1-halogen-2-acylamino-napthalene sulphonic acid by the influence of the acid present in the reaction mass or still to be added hereto. The 1-halogen-2-acyl-amino-naphthalene-monosulphonic acids are partly new compounds. The carboxylic acid residue is split off therefrom in the customary manner. The compounds thus obtained correspond to the general formula

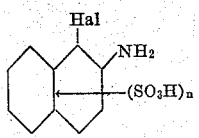

wherein $n$ means the number 1 or 2.

Some of these sulphonic acids were hitherto prepared only in a complicated way, others were unknown hitherto. They may be employed as starting materials for the manufacture of dyestuffs.

In order to further illustrate my invention the following examples are given, the parts being by weight and all temperatures in centigrade degrees, but it may be understood that my invention is not limited to the particular products or reacting conditions mentioned therein.

Example 1

22.3 parts of 2-amino-naphthalene-6-sulphonic acid and 15 parts of crystallized sodium acetate are introduced into 100 parts of water. Then 12.5 parts of acetic acid anhydride are added at 70–80°. When a test of the reaction solution can no more be diazotized, the mass is cooled to about 30° and mixed with 25 parts of a sodium hypochlorite solution of 15% strength. An elevation of the temperature above 40° is advantageously avoided by cooling. Then about 80 parts of hydrochloric acid 19° Bé. are quickly added and the mass is stirred for some time. The new 1-chloro-2-acetylamino-naphthalene-6-sulphonic acid thus obtained separates in the form of a thick pulp of crystals and is isolated by filtration. This acid is dissolved at about 70° in 300 parts of water. The solution is mixed with 25 parts of sulfuric acid 66° Bé. and heated while stirring to about 100° for about 4 hours. The formed 1-chloro-2-amino-naphthalene-6-sulphonic acid separates thereby in a crystalline form. When cool it is filtered off and washed with ice-water. It corresponds to the formula

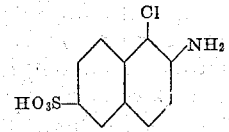

It is easily soluble in alkalies, it is capable of being diazotized, but does not combine with diazo-compounds.

Example 2

2-amino-naphthalene-8-sulphonic acid is acetylated as described in Example 1. 30 parts of the sodium salt of the formed 2-acetylamino-naphthalene-8-sulphonic acid are dissolved at 70° in 200 parts of water. The solution is cooled to about 40° and mixed at this temperature with 4 parts of sodium chlorate and thereafter with 100 parts of hydrochloric acid. The mixture is stirred for some time and then heated to 100° for several hours. The new 1-chloro-2-amino-naphthalene-8-sulphonic acid of the formula

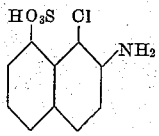

thus obtained separates thereby in the form of a difficultly soluble crystalline powder. It is isolated by filtration. It shows similar properties as the compound described in Example 1.

*Example 3*

Into a solution of 22.7 parts of 2-amino-naphthalene-5-sulphonic acid and 18 parts of sodium acetate in 100 parts of water, 13 parts of acetic acid anhydride are allowed to drop in at about 65°. When the acetylation is finished the mass is cooled to 30° and quickly mixed while stirring with 35 parts of a sodium hypochlorite solution of 15.5% strength. After the addition of about 50 parts of sulphuric acid 66° Bé. the mixture is stirred at about 100° for several hours. When cool the formed 1-chloro-2-amino-naphthalene-5-sulphonic acid separates and is isolated by filtration. It corresponds to the formula

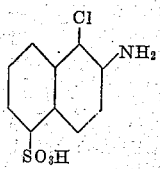

and shows similar properties as the compounds described in the foregoing examples.

*Example 4*

The sodium salt of 2-amino-naphthalene-7-sulphonic acid is dissolved in water. The solution is mixed with sodium acetate and with para-toluene-sulfochloride. When the amino-napthalene-sulphonic acid has disappeared and the formation of the para-toluene-sulfamino compound is completed, bromine is added to the mass. Thereafter sulfuric acid is admixed and the mass is heated while stirring to about 100° for some hours.

The formed 1-bromo-2-amino-naphthalene-7-sulphonic acid separates in the cold and is isolated by filtration. It corresponds to the formula

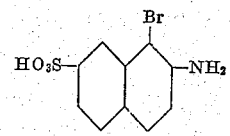

In an analogous manner 1-halogen-2-amino-naphthalene-disulphonic acids are obtained, for instance 2-amino-naphthalene-5.7-disulphonic acid yields when treated correspondingly 1-chloro-2-acetylamino-naphthalene-5.7-disulphonic acid and 1-chloro-2-amino-naphthalene-5.7-disulphonic acid.

I claim:—

1. A process which comprises replacing one hydrogen atom of the $NH_2$ group of a 2-amino-naphthalene sulphonic acid of the general formula

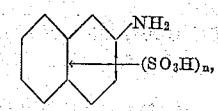

wherein $n$ means the number 1 or 2 by a carboxylic acid residue, treating the 2-acyl-amino-compound thus obtained with a halogenating agent in an aqueous medium, leaving the product of halogenation to the influence of a strong mineral acid and finally splitting off the carboxylic acid residue by saponification.

2. A process which comprises replacing one hydrogen atom of the $NH_2$ group of 2-amino-naphthalene sulphonic acid of the general formula

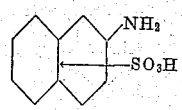

by a carboxylic acid residue, treating the 2-acyl-amino compound thus obtained with a halogenating agent in an aqueous medium, leaving the product of halogenation to the influence of a strong mineral acid and finally splitting off the carboxylic acid residue by saponification.

3. As a new compound 1-chloro-2-amino-naphthalene-8-sulphonic acid of the formula

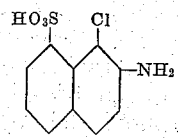

which compound is when dry a colorless crystalline powder, easily soluble in alkalies and capable of being diazotized.

In testimony whereof, I affix my signature.
NORBERT STEIGER.